United States Patent [19]

Szakaly

[11] Patent Number: 5,038,089
[45] Date of Patent: Aug. 6, 1991

[54] SYNCHRONIZED COMPUTATIONAL ARCHITECTURE FOR GENERALIZED BILATERAL CONTROL OF ROBOT ARMS

[75] Inventor: Zoltan F. Szakaly, Tujunga, Calif.

[73] Assignee: The United States of America as represented by the Administrator of the National Aeronautics and Space Administration, Washington, D.C.

[21] Appl. No.: 264,326

[22] Filed: Oct. 28, 1988

Related U.S. Application Data

[63] Continuation-in-part of Ser. No. 172,105, Mar. 23, 1988, abandoned.

[51] Int. Cl.$^5$ .................. G05B 19/24; G06F 15/46
[52] U.S. Cl. ........................ 318/568.11; 318/573; 364/513
[58] Field of Search ............ 318/567, 569, 568.11, 318/568.17, 568.20, 565, 566, 570-577; 364/513; 901/3, 6, 14, 19, 23

[56] References Cited

U.S. PATENT DOCUMENTS

| | | |
|---|---|---|
| 3,890,552 | 6/1975 | Devol et al. . |
| 4,021,651 | 5/1977 | Mitsuhashi et al. ............ 364/513 X |
| 4,099,107 | 7/1978 | Eder . |
| 4,201,937 | 5/1980 | Irie .................. 318/568.11 |
| 4,260,941 | 4/1981 | Engelberger et al. . |
| 4,275,986 | 6/1981 | Engelberger et al. . |
| 4,300,080 | 11/1981 | Lee . |

(List continued on next page.)

FOREIGN PATENT DOCUMENTS

| | | |
|---|---|---|
| 57-113118 | 7/1982 | Japan . |
| 60-209802 | 10/1985 | Japan . |
| 60-214007 | 10/1985 | Japan . |
| 60-230206 | 11/1985 | Japan . |

OTHER PUBLICATIONS

Control of Remote Manipulators, *Handbook of Industrial Robotics*, Wiley, New York, Chapter 17, pp. 320-333, 1985.

S. Lee, G. Bekey, and A. K. Bejczy, Computer Control of Space-Borne Teleoperators with Sensory Feedback, *Proceedings of the IEEE International Conference on Robotics and Automation*, St. Louis, MO, Mar. 25-28, 1985, pp. 205-214.

"Universal Computer Control System (UCCS) for Space Telerobots", IEEE, *Proceeding of the International Conference on Robotics*, 1987.

A. K. Bejczy and J. K. Salisbury, Jr., Kinesthetic Coupling Between Operator and Remote Manipulator, *Computers in Mechanical Engineering*, vol. 1, No. 1, Jul. 1983, pp. 48-60.

*Primary Examiner*—William M. Shoop, Jr.
*Assistant Examiner*—Paul Ip
*Attorney, Agent, or Firm*—Thomas H. Jones; John R. Manning

[57] ABSTRACT

A master six-degree-freedom Force Reflecting Hand Controller ("FRHC") is available at a master site where a received image displays, in essentially real-time, a remote robotic manipulator which is being controlled in the corresponding six-degree-freedom by command signals which are transmitted to the remote site in accordance with the movement of the FRHC at the master site. Software is user-initiated at the master site in order to establish the basic system conditions and then a physical movement of the FRHC in Cartesean space is reflected at the master site by six absolute numbers that are sensed, translated, and computed as a difference signal relative to the earlier position. The change in position is then transmitted in that differential signal form over a high speed synchronized bilateral communication channel which simultaneously returns robot-sensed response information to the master site as forces applied to the FRHC so that the FRHC reflects the "feel" of what is taking place at the remote site. A system-wide clock rate is selected at a sufficiently high rate that the operator at the master site experiences the Force Reflecting operation in real time.

27 Claims, 4 Drawing Sheets

U.S. PATENT DOCUMENTS

| | | |
|---|---|---|
| 4,362,978 | 12/1982 | Pollard et al. . |
| 4,396,987 | 8/1983 | Inaba et al. .......................... 364/513 |
| 4,420,812 | 12/1983 | Ito et al. ........................ 318/573 X |
| 4,475,160 | 10/1984 | Inaba . |
| 4,488,241 | 12/1984 | Hutchins et al. . |
| 4,503,507 | 3/1985 | Takeda et al. . |
| 4,510,574 | 4/1985 | Guittet et al. ........................ 364/513 |
| 4,543,639 | 9/1985 | Inaba et al. ................. 318/568.11 X |
| 4,549,276 | 10/1985 | Inaba et al. ................. 318/568.11 X |
| 4,608,525 | 8/1986 | Mori et al. . |
| 4,611,296 | 9/1986 | Niedermayr . |
| 4,613,269 | 9/1986 | Wilder et al. ........................ 364/513 |
| 4,621,331 | 11/1986 | Iwata . |
| 4,621,332 | 11/1986 | Sugimoto et al. . |
| 4,633,385 | 12/1986 | Murata et al. . |
| 4,639,652 | 1/1987 | Takahashi et al. . |
| 4,661,032 | 4/1987 | Arai ............................... 364/513 X |
| 4,684,862 | 8/1987 | Rohrle . |
| 4,730,258 | 3/1988 | Takeda et al. ................. 318/568.11 |
| 4,833,624 | 5/1989 | Kuwahara et al. ................. 364/513 |
| 4,837,734 | 6/1989 | Ichikawa et al. .................... 364/513 |

SYNCHRONIZED COMPUTATIONAL ARCHITECTURE FOR GENERALIZED BILATERAL CONTROL OF ROBOT ARMS

ORIGIN OF THE INVENTION

The invention described herein was made in the performance of work under a NASA contract, and is subject to the provisions of Public Law 96-517 (35 USC 202) in which the Contractor has elected not to retain title.

This application is a continuation-in-part of a pending application by the inventor hereof, assigned to the same assignee and identified as A UNIVERSAL COMPUTER CONTROL SYSTEM FOR MOTORS, filed on Mar. 23, 1988 and having Ser. No. 172,105, now abandoned.

FIELD OF THE INVENTION

This invention relates to a bilateral, synchronized communication system for remote control of a robotic manipulator by a master controller at a local, or master site wherein intense hardware/software controlling computations, are required at each site; and such computations are accomplished by interrupt-driven servo loops that include a bilateral transmission channel. More particularly the invention relates to interrupt driven software combined with hardware synchronism, which combination provides synchronized computational capabilities at both sites with a balanced load on the bilateral communication medium that interconnects the two sites.

BACKGROUND OF THE INVENTION

Space telerobot systems may present a master control site that is many, many, miles away from the remote site. Teleoperator mode of control with a back-driveable hand controller implies communication-intensive feedback to the master site. Moreover, both site locations must have essentially real-time information of what has transpired at the other site location. In a teleoperator mode, software such as a display readout/visual display is essential and further complicates the communication requirements. Commands on a hand-held grip at the master site must perform intricate and precise movement and manipulation of a robot's joints and it's end effector at the remote site.

Communication by data transmission links is obviously mandatory, and simple, yet efficient ways of handling large amounts of data is essential for an efficient system performance. Computer control at each site for sensing, encoding, transmitting/receiving, mathematically translating, viewing and responding to such robotic control information involves processor activities that are computational intensive at each site. Such computer control is eminently the most reasonable approach when the manual master controller is not a kinematic and dynamic duplicate of the robot arm, but instead takes the form of a generalized force-reflecting hand controller which is interfaceable to any robot. Such a master controller is exemplified by an experimental device that has been developed at the Jet Propulsion Laboratory (JPL). In that experimental device, the kinematic and dynamic relations between master and robot arms are established through mathematical transformations embodied in computer programs in the control station. See A. K. Bejczy and J. K. Salisbury, Jr., Kinesthetic Coupling Between Operator and Remote Manipulator, *Computers in Mechanical Engineering*, Vol. 1, No. 1, July 1983, pp. 48–60. Such transformations per se are well known and do not form part of this invention.

The master location will often include a hand controller that is capable of movement in six degrees-of-freedom ("d.o.f."), which hand controller preferably is back-driveable in those degrees in order to supply a "feel" of what is taking place at the remote site. Control action, whether manual or computer-driven, involves many well known control modes including pure position, pure rate, hybrid position and rate, and/or a hybrid position and force control mode.

All of the aforementioned modes may advantageously benefit from software control programs, and each mode of control may require the hand controller to be software restricted to one or a limited number of the six possible degrees-of-freedom that are available. These numerous and inter-connected system requirements present a complex telemanipulation problem that is further complicated by the communication difficulties encountered by the great distances between the master and remote sites.

Future space operations relating to space station, satellite and space platform servicing, maintenance and assembly call for an increased application of telerobots. The term telerobot denotes a mobile and manipulative machine which can be controlled via (automatic-/autonomous) modes of control. A typical machine of this category is illustrated in FIG. 1 of an article co-authored by the inventor hereto entitled "Universal Computer Control System (UCCS) for Space Telerobots", IEEE *Proceeding of the International Conference On Robotics*, 1987 which article forms the basis for the parent application of this continuation-in-part application. The typical machine of FIG. 1 of the above-identified article has redundant arms, multi d.o.f. end effectors, and several TV cameras and light sources on independent multi d.o.f. platforms. The number of actuators or motors required to drive the articulated elements of a typical telerobot machine of this category can be thirty or more. The large number of computer controlled motors in space telerobot systems, and the inherent requirement of their computer control coordination, was the motivation behind the JPL research and development of a Universal Computer Control System ("UCCS") which includes a Universal Motor Control ("UMC") for all of the motor elements of a space telerobot system as described and claimed in the parent application.

The UCCS and UMC portion of the parent application is not repeated in detail in this application but is highly useful for digital control over and digital feedback from the many joint motors involved in the master-slave interrupt-driven synchronized system of this application. In addition, it should be noted that the invention of that parent application involves a motor control system which is capable of fulfilling the diverse overall requirements faced in the novel telemanipulator system disclosed herein although other motor control systems would be applicable as well. Most of the lower-level details of that parent application will not be repeated herein and those details as well as some of the general system aspects will, instead, be incorporated by reference as is set forth more explicitly hereinafter.

Some of the prior art relevant to consideration of the novelty of this and the parent application will now be discussed. Robotic control articles and prior art patents of the parent application are simply listed herein and reference to the parent may be made for more detailed consideration of this prior art. Two published systems, of general interest, are described in Control of Remote Manipulators, *Handbook of Industrial Robotics,* Wiley, New York, Chapter 17, pp. 320-333, 1985 and S. Lee, G. Bekey, and A. K. Bejczy, Computer Control of Space-Borne Teleoperators with Sensory Feedback, *Proceedings of the IEEE International Conference on Robotics and Automation,* St. Louis, Mo., Mar. 25-28, 1985, pp. 205-214.

The patents resulting from a search in the parent application include the following:

| Inaba | 4,475,160 |
|---|---|
| Hutchins et al. | 4,488,241 |
| Niedermayr | 4,611,296 |
| Japan | 60-230206 |
| Japan | 60-214007 |
| Japan | 57-113118 |
| Japan | 60-209802 |
| Eder | 4,099,107 |
| Lee | 4,300,080 |
| Iwata | 4,621,331 |
| Sugimoto et al. | 4,621,332 |
| Pollard et al. | 4,362,978 |
| Takahashi et al. | 4,639,652 |

A prior art search was conducted relative to this invention and the following patents were noted.
Murata U.S. Pat. No. 4,633,385
Mori U.S. Pat. No. 4,608,525
Engelberger U.S. Pat. Nos. 4,260,941 and 4,275,986
Devol U.S. Pat. No. 3,890,552
Takeda U.S. Pat. No. 4,503,507
Rohrle U.S. Pat. No. 4,684,862

None of these references teach or suggest the invention as herein described or claimed. For example, none of the references teach or suggest the use of sensory data at the robot site which is transmitted over a balanced-load communication channel to backdrive "feel" actuators on the hand controller of the master arm. These features involve computational intense problems that are solved by a novel synchronism and software/hardware configuration that is first presented in this disclosure.

SUMMARY OF THE INVENTION

A master six-degree-freedom Force Reflecting Hand Controller "FRHC") is available at a master site where a received image displays, in essentially real-time, a remote robotic manipulator which is being controlled in the corresponding six-degree-freedom by command signals which were transmitted to the remote site in accordance with the movement of the FRHC at the master site. Software is user-initiated at the master site in order to establish the basic system conditions and then a physical movement of the FRHC in Cartesea n space is reflected at the master site by six absolute numbers that are sensed, translated, and computed as a difference signal relative to the earlier position. The change in position in the form of a difference in absolute positioning is then transmitted in that differential form over a high speed synchronized bilateral communication channel which simultaneously returns robot-sensed response information to the master site as forces applied to the FRHC so that the FRHC reflects the "feel" of what is taking place at the remote site. A system-wide clock rate is selected at a sufficiently high rate that the operator at the master site experiences the Force Reflecting operation in real time.

A Universal Motor Control (UMC) for the telerobot motors of a space telerobot (FIGS. 1 and 2 of the parent application) is located at a master and at a remote site. Forward and inverse kinematic computations, necessary for controlling a robotic manipulator, are performed at the remote site by a forward kinematic ("FK") processor and an inverse kinematics ("IK") processor that are both connected to a multibus system so that a shared memory is used by these processors. A joint command processor ("JOINT") responds to the IK processor to execute and sense the FRHC-commanded movement of the robot's joint motors. Actual movement of the robot is sensed and signals indicative of that movement are fed back to the master controller under control of Communication processors ("COMM.") connected to both ends of a communication medium that links both sites together by a synchonised and balanced load data transmission of differential position data. Those data signals being returned to the master site are indicative of the robot's movements, and when such signals are received at the master site, they are converted by use of a transformation processor to forces of "feel" in the FRHC at the master site.

Each site's computational power is provided by a multibus computer system which is characterized by a plurality of processors (IK, FK, JOINT, COMM., etc.) with all processors being connected to a common bus master. Each multibus system includes at least one, and more typically, several, joint command processor(s) each connected to a respective joint controller card(s) through a direct, or BLX, bus. These joint processors through digital data signals control the actual motor response and sensing functions.

System operation involves both a high-level and a low-level command at each site. The system's high-level command involves computations outside of the joint servo loop portions of the system. Included within the components for the high-level command are the software, interrupts, FK and IK processors, the bilateral communication link and the link's interface units. The low-level command involves primarily the local components that constitute the joint servo loop components within the individual site locations. Included within the low-level command are, for example, a joint command processor which controls a plurality of direct current torque joint motors of the type used in telerobot joints, a telerobot "smart" hand, and response/sensing devices for achieving actual reflective control over the master FRHC and the robotic manipulator by joint command signals.

Synchronized interrupt driven timing is employed in the system with repeated and synchronized periodic transmission of data taking place over a balanced load bilateral communication channel. Both sites thus end up being synchronized at the same timing rate and the computations and data transmission is accomplished at a maximum transmission rate with a minimum of lost interrupt overhead time. System operation is so efficient that the controlled manipulator's movements are viewed in essentially real time, and the master controller supplies to the operator resisting forces on the FRHC, which forces indicate a reflected "feel" of the control that is taking place at the remote site.

DETAILED DESCRIPTION OF THE DRAWINGS

Figure 1:
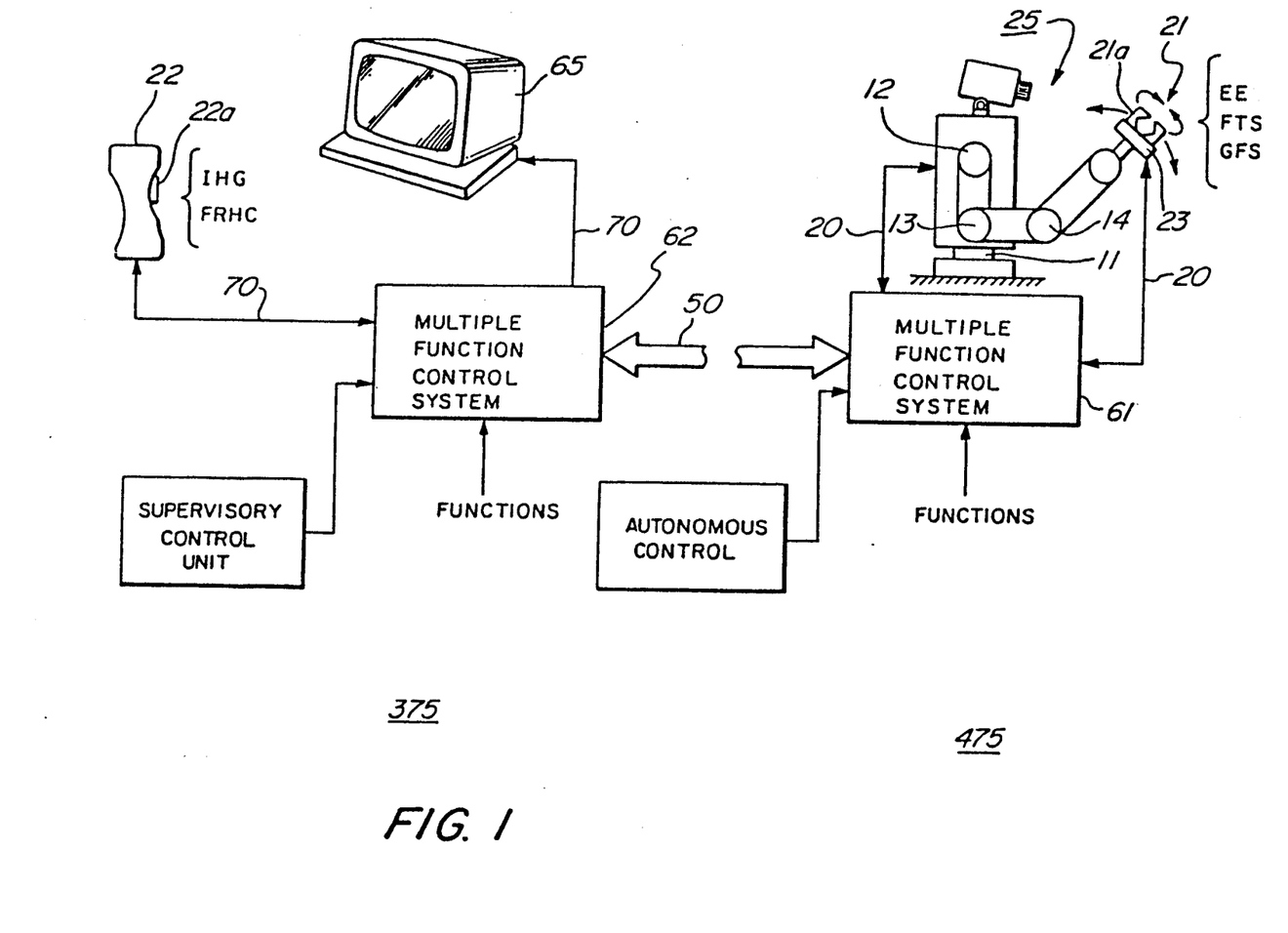
FIG. 1 is a highly simplified block diagram of a distributed multibus-based computing architecture for master/slave telerobot control in accordance with this invention.

FIG. 1 depicts the general operating environment for the invention. The environment includes a master site 375 connected to a remote site 475. A space telerobot 25 at a remote location is shown connected to a local control station 61 by a two-way communication link 50. Robot 25 includes numerous joints such as a base 11, shoulder 12, elbow 13, wrist 14, and a smart "hand" or end effector 22. Each of these joints respond to a commanded movement via a joint motor that is selectively driveable by motor current as supplied by the Universal Motor Control ("UMC") of the parent application. The detailed description of that UMC portion of the Universal Computer Control System ("UCCS"), including FIGS. 2a, 3, 4 and 5 are hereby incorporated by reference in accordance with Section 608.01(p) of the Manual of Patent Examining Procedure.

FIG. 1 is repeated from the parent application and it will be described only briefly in connection with a summary of the UCCS system of the parent application, which UCCS is also employed to advantage in this invention. Abbreviations on FIG. 1 on the left side denote: IHG: instrumented hand grip having a trigger 22a and multiple function switches (understood, but not shown); FRHC: force-reflecting hand controller 22 having six degrees-of-freedom and six, or more joint motors. FRHC 22 also includes sensing units, preferably associated with the motors, which sensing units are capable of sensing and converting to electrical signals vital command information about the movement of the hand controller 22.

In the currently preferred form of this invention, such movement will be imitated by the slave robot 25 at the remote site 475. Such information, with respect to position for example, includes direction of movement, amount and rate. These and other similar parameters are sensed for each one of the six motors and that sensed information is automatically servoed to and back from the robot 25 over communication medium 50.

On the right side of FIG. 1 the abbreviations denote: EE: end effector 22 (robot hand); FTS: force-torque sensor 23 at the base of the end effector 22 for sensing all three orthogonal forces and moments; GFS: grasp force sensor 21a which senses grasp force at the base of the claws or robot fingers. The smart hand 21 contains any suitable and well known electronics, such as those which include a microprocessor integrated into the hand 21 for sensor data handling and automatic hand control. In the automatic mode for the remote site 475, the smart hand 21 responds to command signals that are applied to the hand 21 after processor computations accomplished at the remote site have been initiated by master-site commands that were transmitted to the remote site 475 via signals that were originated at the master site. The received signals to be processed are received at the remote site 475 after those signals have first been been formulated to a differential format that is highly advantageous for the system operation of this invention.

Several different control modes at the master site 375 may be employed in forming the remote site command signals. Those various master site operational modes will be described in more detail hereinafter. It need only be noted at this point; however, that the remote site 475 receives the same type of command signals in accordance with this invention regardless of the operational mode at the master site. The heart of the overall system configuration includes multiple function control units 60, 61 of FIG. 1 at the site locations 375, 475. Units 60 and 61 have essentially identical primary components at each site location for performing three primary functions of: (1) UCCS/UMC, (2) Communications, (3) and Computations.

Motor control at the robot site and motor control at the master site represent, respectively, the control action and the force reflection of the invention. These feature are achieved by signal control over what is essentially mirror-image motor sets at both site locations. Digital signals achieve the motor control by use of a Pulse Width Modulated system approach. The details of that so-called Pulse Width Modulated Motor ("PWM") control is supplied in the parent application and will not be repeated here. Instead, only a brief and highly summarized operation in connection with FIG. 2 is believed necessary.

Figure 2:
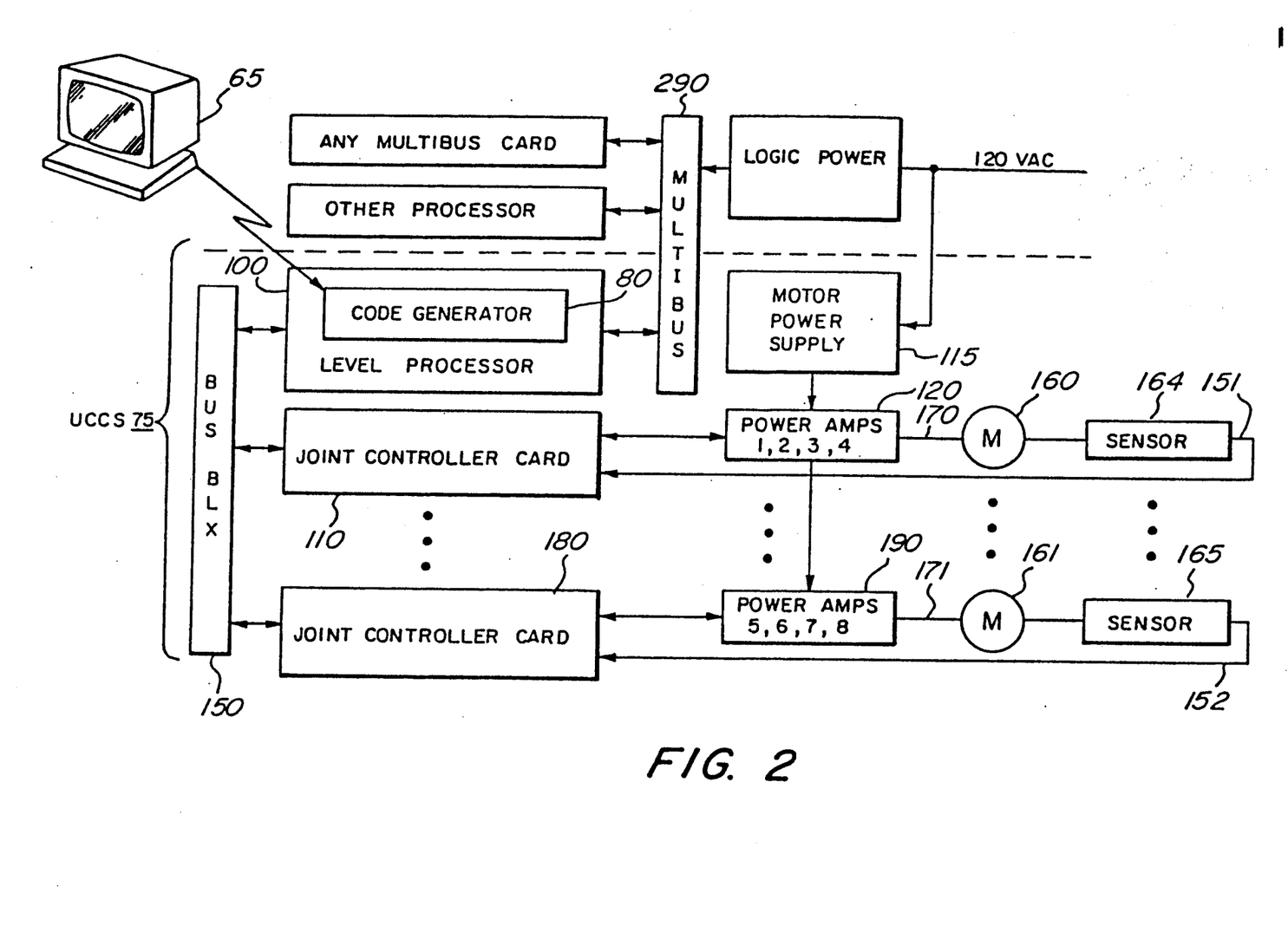
FIG. 2 is a general block diagram of the multibus-based system of FIG. 1, and includes the major hardware components of the UCCS of this invention.

In FIG. 2 the sensors for sensing actual movement are shown simply as blocks 164, 165, etc. and two joint motors 160 and 161 are shown connected to power amplifiers 120 and 190 which are under control of the joint controller cards 110 and 180. Each joint motor is assigned an address in the joint controller card, which address is interrupt-addressable as though it were the command processor's own memory. This interrupt approach for a shared memory stores, at each joint motors own address, the "old" Cartesean absolute position and orientation values for the FRHC or the robot manipulator. At the next clock time the shared memory stores the device's "new" Cartesean absolute position and orientation values. The timing and system-wide clock and data manipulation and transfer features of this invention is given in greater detail hereinafter with respect to the detailed description of FIGS. 3 and 4. At this point however, a brief description of the computation and signal handling feature of FIG. 2 is believed to be in order.

Each joint motor (160, 161, etc.) is connected to the joint processor card (110, 180) and responds to digital control signals sent from the joint command processor 100 through BLX bus 150. and multibus 290. All motor control and motor sensing parameters for all of the system's plurality of joint motors are via digital signals transmitted to and from the joint command processor 100.

The UCCS hardware 75 is shown below the dashed line in FIG. 2. The three major UCCS hardware components are the following: joint level processor 100, up to 4 joint controller cards, 110, 180, etc., and up to 16 pulse width modulated (PWM) power amplifiers, 120, 190, etc. Motor power is supplied by a power supply 115. A plurality of motors, such as motors 160, 161, etc., are controlled by the PWM amplifiers 120, 190 over control leads 170, 171. Each motor includes a plurality of sensors such as sensors 164, 165.

The UCCS hardware 75 is shown below the dashed line in FIG. 2. The three major UCCS hardware components are the following: joint level processor 100, up to 4 joint controller cards, 110, 180, etc., and up to 16 pulse width modulated (PWM) power amplifiers, 120, 190, etc. Motor power is supplied by a power supply 115. A plurality of motors, such as motors 160, 161, etc., are controlled by the PWM amplifiers 120, 190 over control leads 170, 171. Each motor includes a plurality of sensors such as sensors 164, 165. Quite obviously the number of motors and processors depends upon the system requirement. The format for the digital signals may also vary, but in this instance consist of a byte of data that is formatted by a header, followed by six eight bit words (one word for each position/orientation dimension) and a trailer.

When a robot 25 is first connected to the controller of the UCCS, it is not known which direction the joint motor of each robot's joint is going to move when positive voltage is applied. It is not known which direction the encoder will count if a particular robot joint is moved to what the user considers a positive direction. The polarity of the motor's potentiometer and brake is not known either. Position limits and origins must also be specified. These and other parameters, in accordance with this invention, are specified by an interaction between the user and the control system via a software accessible terminal. A software-responsive hardware device, such as a memory having a code generator 80, is provided in the joint command processor 100. The code generator 80 is characterized by a predetermined program-writing capability which reduces the user's onerous task of program writing.

Programming language and development environment

The choice of development environment is a most crucial decision. Most problems in developing complex systems arise from insufficient control over what is going on in the system. This often results when high level languages are used since the compiler "takes care" of many issues thereby rendering the program developer unaware of problems. The result is reduced control over what is a fast editor, fast compiler, fast downloader, and the ability to combine assembly language routines with high level modules such as having a good C compiler and a fast assembly language library with many functions in it.

Our system was developed entirely in assembly language using IBM-AT's as host machines, and a development system that was written in-house. The editor and downloader are fast. To save time the TDS assemble was used which is not ideal to do the job due to its slow operation. Our editor is such that it simultaneously changes the program in the AT's memory and in the 32000 memory so downloading is not necessary after editing the file. Simultaneously another development environment is being worked on. This further development uses an NSC 32032 coprocessor plugged into an IBM-AT with substantial amount of memory (4 Mbytes) and disk space (70 Mbytes) using an Ethernet line to download programs. This development environment will make it possible to integrate C and assembly programs efficiently. The essential features of this invention, it will be recognized by those of skill in this art, may be accomplished by several different data approaches without departing from the spirit and scope of the invention.

The 32000 family assembly language has proven to be an extremely friendly and efficient one. Program development time was found to be comparable or better than using C for the same job. The use of assembly language made it possible to fully utilize the processors' time and to have complete control over the events in the cardcage.

One key method that greatly reduces program development time is the use of a frame program. Our frame program contains the initialization, sample output of a number to the screen, all the code for all of the interrupts such as serial ports, parallel ports, power failure, incoming multibus interrupts, sample code for generating interrupts and so on. Then a new program was made by making a copy of this frame and erasing the things not needed, and adding the computations particular to this program. This method eliminates the time needed to find out how to do something by looking at old listings, books and so on. Since most of the information is in the frame program, the programmer could concentrate on what to do instead of how to do it. This method also renders the programs uniform and makes it easier to follow the system operation.

The user, when the system is first being initiated, must tell the UCCS what hardware components are present in the motors to be controlled. As a typical example, a newly added joint motor may, but need not have, an encoder. (Nevertheless, it should be noted, a non-encoder motor may be completely integrated into the UCCS.) After the user has supplied the parameters about the system's hardware, via the host terminal 65, to the UCCS system, the joints are moved to find out the approximate inertia gravity, directional polarity, friction, and numerous other parameters. When the initialization is done, the values of these parameters are initially and temporarily stored in the code generator 80, FIG. 2, in the joint level command processor 100, and that processor in turn transfers these parameters to a permanent shared memory storage device which is located in the joint controller card 100.

Universal Computer Control

UCCS, in summary, provides for software control over the following sensing capabilities; (1) Quadrature encoder position; (2) Quadrature encoder index pulse; (3) Potentiometer position; (4) Motor current; (5) Shaft angular velocity; and (6) Motor power supply voltage. These sensing capabilities make it possible to calculate the following quantities: (1) Joint position; (2) Joint speed directly, not derived from joint speed; (4) Motor torque; (5) Load on motor: (6) Motor back-EMF constant; (7) Motor electrical resistance; (8) Motor winding temperature; and (9) Motor power supply status.

UCCS software can identify and act upon the following problems: (1) Open or short in the motor circuit; (2) Broken encoder wire or constant voltage on an encoder input; (3) Potentiometer hardware problem; (4) Various component failures on the joint interface card; (5) Not enough power to drive motors; and (6) All motor simultaneously stop. The self-test and diagnosis capabilities at the motor drive level provide an essential source of information to higher level failure diagnosis and error recovery computer programs, and make a substantial contribution to reliable and fail-safe tele-operation and robot modes of control.

In brief summary, the general sensing capabilities of UCCS are as follows:

* Encoder count (12 bit hardware counter, unlimited software count).
* Encoder index (direct hardware reset or software sense).
* Shaft angular velocity (time measured between encoder pulses).
* One general purpose A/D input per joint.
* Potentiometer position.
* Motor current.
* Inductive freewheeling current (current during PWM off cycle).
* Motor power supply voltage.
* Shaft motion status (moves/stopped, direction of motion).
* Power amplifier status (on-off).
* Three TTL digital inputs for every four joints.

UCCS, briefly summarized, can take the following general control actions:

* Output 8 bit + sign PWM command.
* Turn power amplifier on-off.
* Enable/disable short circuit protection.
* Apply/release electromagnetic brake.
* Enable regenerative braking in either direction.
* Output to any of the two digital output bits per joint.

At each node, a distinct and distributed set of computational functions have to be performed such that data is shared by or transmitted to the various data handling and computing subnodes. Also at each node, many motors have to be computer controlled using data from various sensors and from several computational subprograms. These requirements necessitate a tight integration of motor control programs with other data handling and computational subprograms. The natural needs and generic requirements of distributed but tightly integrated computing is provided by a multibus computer architecture at both locations connected together by a bilateral communication link.

Multiple bus masters 390 (site 475 for telerobot 25) and 290 (master FRHC 22 at control station 375) operating in closely coupled environment enable sharing of information from various sources within each processing node and from node to node. For example, the ability to share memory space makes it easy to synchronize and coordinate telerobot control and sensor data handling, in real time, at either the telerobot or control station sites. The overall computing system based on multibus configuration, in one preferred embodiment, uses Intel Multibus I and National Semiconductor (NS) 32000 series microprocessors. More details on this architecture can be found in A. K. Bejczy, R. S. Botson and Z. Szakaly, Computing Architecture for Telerobots in Earth Orbit, *Proceedings of SPIE Conference on Advances In Intelligent Robotic Systems*, Cambridge, Mass., Oct. 26-31, 1986, incorporated herein by this reference.

Figure 3:
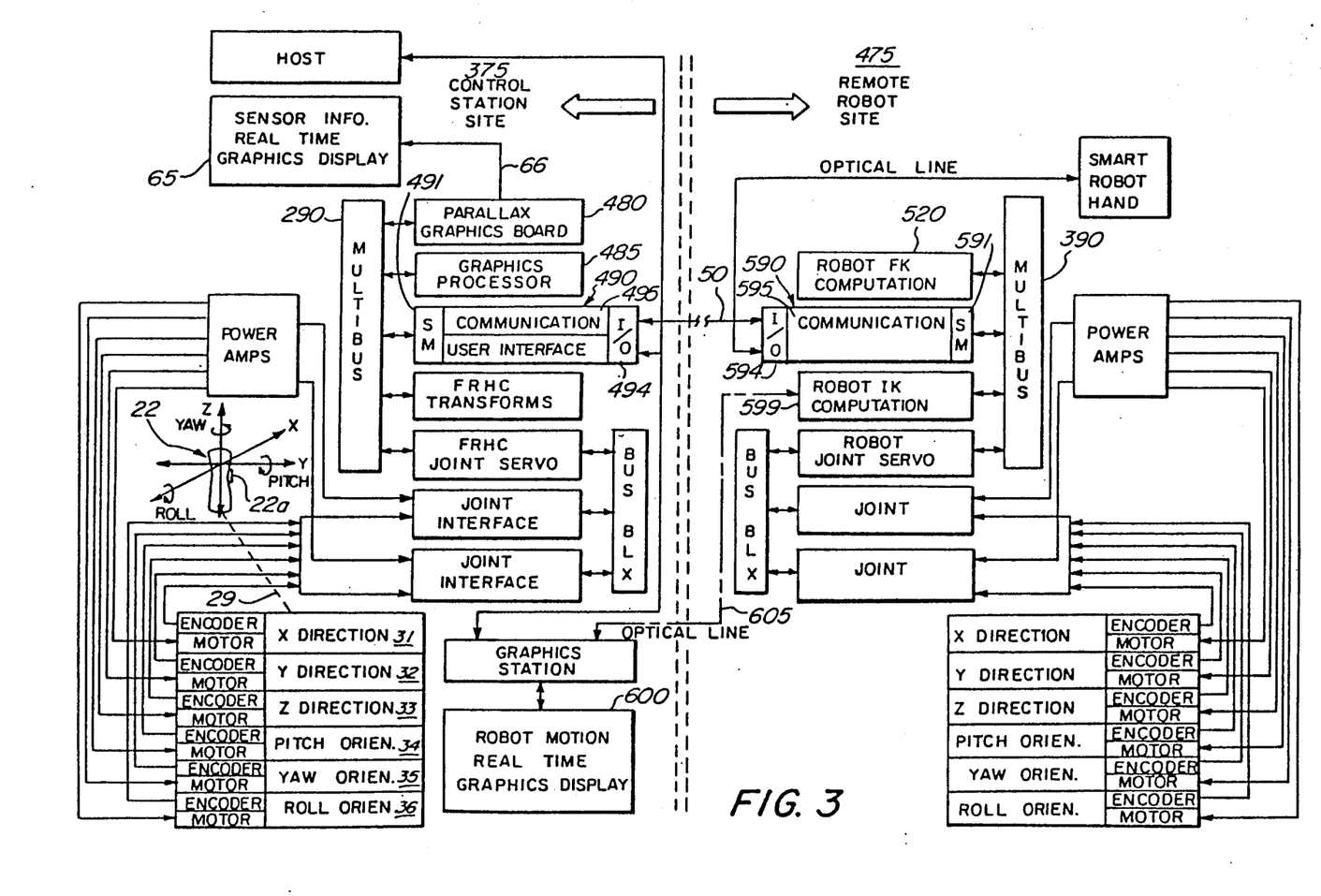
FIG. 3 is a simplified block diagram of the overall system configuration of this invention at both a master and a remote site.

At the master control site 375, unit 60 also presents to the user, via lines 70, a graphics display at the screen of terminal 65. That graphics display may be in real time and is user selectable to provide a presentation of the sensed information that is indicative of the actual positioning of robot 10 as controlled by FRHC 22. Moreover several screens may be utilized depending upon the diverse system requirements that a given situation demands. For example FIG. 3 depicts two screens one of which; namely screen 600 depicts, at the master site 375, the actual robot motion along with a real-time graphics display. In FIG. 3 that screen 600 is supplied video-forming information over a dashed optical link 605. In the space applications and in the instances when the optical link is impractical, the optical link 605 is replaced with a data transmission link of any suitable type.

FIG. 3 depicts a more detailed block diagram of units 60 and 61 which feature the details of this invention. As shown in FIG. 3 both sites 375 and 475 include identical components to a significant degree. Describing the master control site 375 first, an operator-moveable hand controller 22 includes a trigger 22a, which trigger is activated by depression, for example, whenever the operator in this manual control mode seeks actual slave control over the robot 25 at a remote site 475.

An arbitrary position for the controller 22 is defined as a reference location, and for that reference location each of the sensors is assigned an absolute encoder value such as, for example, zero. Spatial movement from that reference location, creates a new absolute encoded value for each of the sensors, such as sensor/encoders 31, 32, 33, 34, 35, and 36 shown connected to FRHC 22 symbolically by the dashed line 29. There is, in accordance with this invention, a separate sensor/encoder for each one of the six possible degrees of freedom through which FRHC 22 is moveable. At the remote site 475, there is a mirror image group of motors/sensors/encoders 431 through 436. At site 475, however, units 431 through 436 control the robot 25 and return signals to site 375, which return signals are employed in essentially real-time for force reflecting at FRHC 22.

Movement of the controller 22, with trigger 23 depressed, reflects a change in the absolute numerical encoded values for the controller 22 from its old to its new Cartesean position. Six encoded values, although the invention is not strictly limited to that number, define the FRHC's new and changed position in both direction and orientation. Included at every system wide sampling, or clock, time are three directions, X, Y, and Z and three orientations, namely YAW, PITCH and ROLL as symbolically shown and labeled in FIG. 2.

Encoders 31, 32, 33, etc. each develop an absolute spatial value that indicates the new position by a new absolute value at the next sampling time. Those encoded values may, if so desired, be presented, in readable form on the screen of the user-operable terminal 65, which is connected via signal control lines 66 to one of the multibus processors 480 which in this system may serve as a parallax graphics board. Such a board, as is well known, displays a fixed image along with a variable image. As a representative example the board 480 will output a fixed image of the six degrees of freedom in graphic form and simultaneously that board 480 can draw from the shared memory 491 the real-time values of the commanded movements.

Processor 485, as is true for the other processors, may be any suitable processor that is software addressable and operator changeable in order to alter the display as may be required for a diverse number of system requirements. Such processors are well known as are the parallax board 480 and the display/terminal 65.

Processor 490, at site 375 and processor 590 at site 475 are both comprised of several primary components, such as I/O interface circuits 494, 594 for handling input and output signals to and from other processors, terminal 65, etc., shared memories 494, 594 and communication controls 495, 595. Processors 490,590 are respectively connected to the multibus connectors 290, 390 and they communicate together over a two-way data transmission link 50. In a space repair appplication, for example, the two-way link 50 may be any suitable data transmission link that is equipped with synchronized data capabilities as is well known. Also connected to the multibus 390 at the remote site 475 is another processor, FK processor 520, which processor performs the mathematical transformations required in converting operator-initiated spatial commands, via FRHC 22, to a format which is suitable to drive the various motors of robotic manipulator 25.

Processor 590 includes any well known signal transforming circuitry of a type that is responsive to input signals of one particular format for changing those input signals to another format. Typical of the type of circuitry for processor 590 is a processor formatted to convert signals of one format to joint angle command signals that are typically used in this art. Any conventional local site signal format is suitable for this invention. For example, processors 490,590 may receive assembly language in any suitable hardware/software convertible form from host terminal 65 (or a comparable terminal for local operation, if desired) and such processors respond by converting that assembly language to the proper mathematical transformations for driving the joint motors at the master or remote site as applicable. Before describing the timing details of the processor operations in more detail, it is believed helpful to list the various operating modes that the system is capable of handling.

The local or master site is where an operator will sit and hold the FRHC 22 in his hand, and by appropriate operator movements of the hand control 22 will, through the use of the invention, control the force/positioning of the robot 25 in the remote site. In general, the system operation supports several modes of master-site control for each task-space axis independently. Each axis of the robot's smart hand, end effector 21, can be controlled in Position, Rate, Force-reflecting, or Force-Nulling modes of operation. Of these modes, Position, Rate and Force-reflecting exist solely at the master site. In contrast, Force-Nulling exists only at the remote site. Each of these operating modes will now be described briefly.

In a position control mode, position commands are generated at the master site and those commands are fed to the remote site over the bilateral data communication link 50. The position mode at master site 375 servos the slave robot 25 at the remote site 475, so that its position, orientation, and grasp force matches the position and orientation of the FRHC 22 at the master site. As presently implemented the grasp force is actually controlled by a software command that is applied by the operator through terminal-loaded data or some other suitable computer compatible device or component. It is, however, well within the scope of this invention that numerous other types of commands, such as grasp force, vibration, etc. may be applied by suitable hand-operated switches, buttons, and the like which are operator-responsive on FRHC 22 at master site 375.

The position ratio between movement at the two sites is available in several ratios such as one to one, two to one, etc. In the system presented herein, the directional dimension is established and is measured in units that are each one-tenth of a millimeter. Each orientation dimension is established and measured in 1/4096th of a radian unit. The round trip servo rate for any one loop is one thousand hertz (FRHC to Robot to FRHC) and the system is set up to operate on incremental changes in position from one clocking interval to the next immediately available clocking interval. In our system the unit dimensional change has been set up to fall within a range limit that has been established as varying between a positive seven volts in one arbitrary direction to a negative seven volts in the opposite direction. Quite obviously these voltages and limits, unit selections etc. are variable to fit the particular FRHC and robot 25 and are not to be taken as limiting the scope or spirit of this invention.

Figure 4:
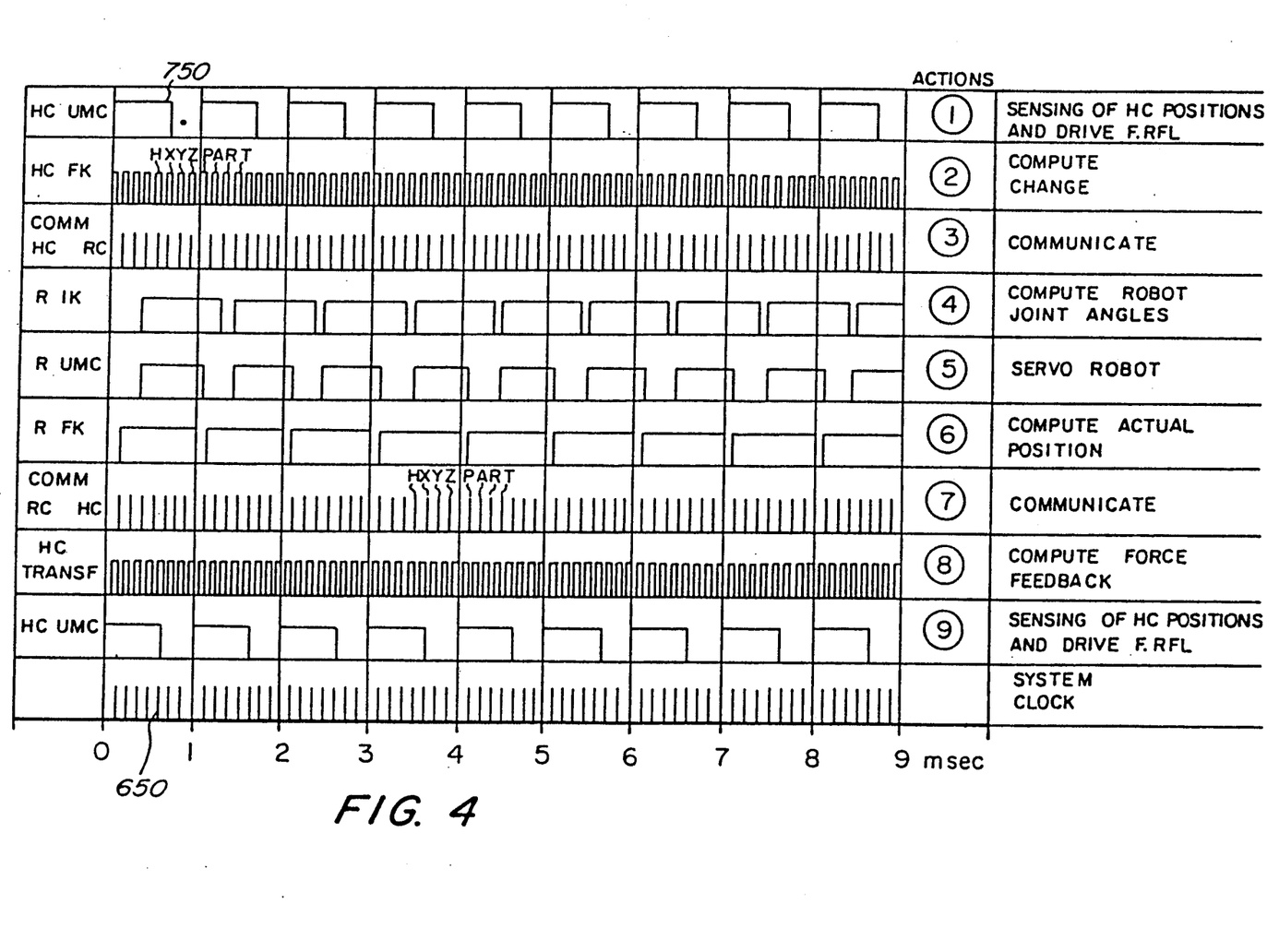
FIG. 4 is a timing diagram that is useful in aiding in the understanding of the system operation of FIG. 3.

Our servo loop in its most basic form is from FRHC to Robot via a position/orientation signal and Robot to FRHC via a force signal. FIG. 4 sets forth the timing and various transactions for the system operation. Each signal shown in FIG. 4 is well labeled and the various abbreviations correspond to the components that are identified by the heading on FIG. 3 and the specification.

In accordance with FIG. 4, there is assumed a sequence "turn on" that the system undergoes just prior to the time indicated as time 0 when neither side can "jump". Thus if the robot 25 is turned on first, that robot will wait and it will not move until commanded to do so. The robot arm and hand is servo protected against gravity causing it to drop. Robot 25 cannot initiate any action. It is a slave and must await FRHC 22 to command its movement. FRHC 22 runs independently and it must be indexed, i.e. trigger 22a depressed, before any system operation is commenced. Indexing assures that the Master controller does not "jump" either.

Code activation methods

After a particular algorithm is encoded into assembly language form, it has to be ensured that the code is executed in a controlled manner, i.e., with the right periodicity. There are several ways of activating code:

1. Jump to the beginning of the code, jump away from the end of it.

2. Call the beginning of the code, execute a return at the end.

3. Interrupt to the beginning, interrupt return at the end.

4. Insert code into other code wherever it is used.

Distinction must be made among these methods based on how much overhead they impose and how tightly they control the moment when the code is activated. The overhead is none in case 4. This method is used in case of assembly or C macro statements. A small overhead is imposed by 1 and 2. From overhead point of view 3 is the worst. In terms of controlling the moment the code is activated 1,2,4 are only as good as the temporal accuracy of the activating code.

From a timing point of view the use of interrupts is superior. The kind of system we have is characterized by several stages of processing, with every stage using the data generated by the previous stage. For example FIG. 4 shows a numerical sequence of "ACTIONS" on the right hand side of the Figure. Review of the time scale along the bottom of FIG. 4, in connection with the listed actions shows that the sequence of actions are repeated and every action follows an earlier one in accordance with the system clock 650, FIG. 4. In a synchronized system all combinations of events happen in a very short time so if the system works during the first 1/10th of a second it will keep working free of undiscovered troubles that tend to plague a non-synchronized system approach of the prior art.

Besides being synchronized by clock 650, all computations that are in the same pipeline should be performed at exactly the same rate. If there is a substantial rate difference between consecutive processes, then either a substantial portion of the first processor's results is lost (wasting the first processor's time) or the second processor does its computation on the same data more than once (wasting the second processors time). If there is very little rate difference between the two consecutive stages, then the wasted processor time is not significant. The problem manifested in that case is beating. For example, if one processor runs at a 1000 Hz rate, the other at 999, then every second the delay will be 1 millisecond more than normal. This causes a 1 Hz oscillation together with its harmonics which may create mechanical vibration or other adverse effects.

There are several ways of synchronizing processes. One common way is to cause one processor to wait in a loop until a bit is changed in shared memory. This we don't find attractive since the periodic checking of bits abuses the inter-processor bus bandwidth. All synchronization should be done via the use of interrupts. The only disadvantage interrupts have is the relatively long time needed to save the return address and registers before the interrupt code starts execution. Interrupts are widely used for transmitting and receiving of ports in almost every computer system, and the multibus environment provides 8 lines for inter processor interrupts. In case of the 32016-10 we measured a 12.5 microseconds interrupt setup time. This does not include the time needed to save any of the registers. The cleanup time is similar, so an interrupt creates about 25 microseconds overhead.

Vector cycling means that an interrupt does not have a fixed vector but the vector is changed depending on external conditions. The interrupt vector may be changed by the interrupt routine itself or by any other part of the program. This method is very powerful in the solution of many problems. It is easier to program than conditional branches and it uses less processor time. Vector cycling and the use of the static base make it possible to write 2 line interrupt routines that are functional.

Code modification means replacing an instruction or string of instructions in the interrupt routine at runtime. For example, replacing an add with a subtract may change the sign of the outcome without having to insert conditional branches into the program. Code modification has to be used when the number of alternative interrupt routines becomes too high to be handled by vector cycling. Code modification saves space as well as time.

Code generation is required when the number of combinations is so high that it cannot be handled by any other method. It refers to building the interrupt routine from predefined building blocks. This is commonly done by compilers. Vector cycling and code modification are not widespread methods in this art area. We use both methods in our system.

Returning to a description of FIG. 4, assume at time 0 as an initial starting point, that the FRHC 22 is physically moved by the operator from its old to its new position. That movement, signal 750, will be sensed by the sensors on the FRHC unit 22 and is shown as action no. 1 in FIG. 4. The new position will be represented in new absolute values in all six degrees of freedom. Thus the new position will have a differential value for X, Y, Z, ROLL, PITCH, and YAW than the FRHC 22 had prior to the movement. Those new differential values are in a fixed sequence between a header "H" and a trailer "T" as shown in action 2, FIG. 4. The sequence of values is shown as positions "X", "Y", and "Z", followed by pitch,"P", yaw,"A", and roll,"R". Action no. 3 depicts the synchronized transfer of these differential values.

The use of differential data on the communication channel

The communication channel has to be narrow, i.e., the communication bandwidth has to be reduced if the total system cost is not going to be too high. Since there are six degrees of freedom in the system, clearly the minimum information that has to be passed via the communication channel is the value of six numbers. Robot 25 moves in time on a controlled and continuous trajectory in both position and orientation. The practical limitations for an operator control in a master-slave situation can efficiently be achieved in essentially real-time. This observation allowed me to apply a system design principle with limited velocity and a smaller required bandwidth by transmitting the differential change in position (and orientation, as well) rather than transmitting the absolute values themselves. Since this change is self limiting in a practical sense my method invention imposes a velocity limit on the robot 25. This velocity limit, in equation form, is:

$$V1 = N*U*C1 \tag{1}$$

where:
V1 is the robot velocity limit;
N is the servo rate;
U is the unit in which robot position is measured; and
C1 is the limit of the change data transmitted.

The communication channel has to transmit additional information besides the desired robot position, and a method must exist to find the framing i.e. which data belongs to which degree of freedom. The total number of bytes we transmit is 8 per servo loop. The fist byte is a hex 55. This is easy to sync to since its bits are alternating 0s and 1s. This is followed by six bytes that are the changes of position in each degree of freedom. See "HXYZPART" in action nos. 3 and 7 in FIG. 4. Of each one of the samples change very little from sample time to sample time, only the least significant four bits are used to represent a number in the range −7 to +7. This is followed by the trailing byte that may carry additional information that currently is not being used. In order to be able to carry a lot of data in the trailer byte a "long cycle" is defined. The long cycle is 96 servo loops long, and its beginning is marked by changing the header byte from hex 55 to hex aa. This makes it possible to copy a 96 byte long memory area byte at a time to the receiver side. The receiver receives a new copy of this range of memory over ten times a second. Of course, a piece of data may have multiple copies within this memory range if higher rate is desired.

If the temporal distribution of data is uneven, this necessitates a higher bandwidth channel than the number of bytes actually transmitted over the line. So any communication method that results in non-periodic transmission is an unsubstantiated waste of channel bandwidth resulting in worse than achievable bit error rate and quality of control. In our system we used a periodic transmission. A single byte is transmitted every 125 microseconds. The observed error rate was ten to the minus 7th using a 25 foot unshielded flat cable with an 8255 parallel port on each end. When received the byte is placed into shared memory at the receiver site.

The shared memory 594, FIG. 3, is presently located in the FK processor 590, one quarter of its memory is jumper configured to be accessible from the multibus 390. Currently, this is the only board in the local node chassis besides the above described 3 boards that are part of the UMC. The FK processor is also under control of the central clock 650 of the system which provides interrupts to synchronize both nodes 375 and 475. The most frequent interrupt on this processor is generated at a 125 microsec interval, timed by a counter in the interrupt controller unit. This interrupt is directed to one of 18 interrupt service routines. The action taken by these is dependent on the phase of the system.

There are 8 phases as follows:

Phase 1: The new FRHC positions are imported from the shared memory. The calculation of the FRHC X coordinate is done. The header byte is transmitted (55 or aa if beginning of long cycle).

Phase 2: The Y coordinate is computed. The 4 bit change in the X coordinate is transmitted.

Phase 3: The Z coordinate is computed. The change in the Y coordinate is transmitted. The UMC servo interrupt is triggered.

Phase 4: The pitch coordinate is computed. The change of Z is transmitted.

Phase 5: The yaw coordinate is computed. The change of the pitch is transmitted.

Phase 6: The roll coordinate is computed. The change of the yaw is transmitted.

Phase 7: The change of the roll is transmitted.

Phase 8: The next byte of the parameter area is transmitted as trailer byte.

Even within the same phase the interrupt routine is not always the same. In phase 1 there are four routines. Their use depends on whether the X degree of freedom is in position or rate mode and whether the header byte transmitted is the beginning of a long cycle or normal. In phases 2 to 6 there are two routines for every phase, one for position one for rate mode. Phases 7 and 8 only have one service routine each.

Instead of doing a full forward kinematic computation the current method employed uses the HC joint coordinates as Cartesian positions and as pitch, yaw, and roll coordinates, and does a simple linear transformation with a user selectable gain factor.

An interesting feature of the FK computation is the "slip". Slip means that when the HC is moved too fast for the robot to follow, the robot will simply lag behind and it will not catch up when the HC slows down. This can be used similarly to indexing, but the user does not have to touch the keyboard. The robot can be moved outside the normal HC work envelop by moving the HC suddenly back to the center when the limit is reached. Slowly moving out again will cause the robot to go further in the same direction. Slip can be disabled by code modification from the user interface. With the slip disabled the robot will maintain the position correspondence unless indexing is explicitly commanded.

The only other interrupt in the FK program is the serial port that provides the keyboard interface. This interrupt inserts the incoming character into a ring buffer from where it is removed by the user interface. The user interface is the main program, enables the user to change the following parameters at runtime:

Gain multiplier
HC software spring intensity
Position or rate mode
Enable/freeze
Spring on/off
Global or individual indexing
Velocity limit
slip on/off All of the above-identified parameters can be changed on any degree of freedom independently of the others. Note that "enable" permits to freeze HC commands in any task coordinate. For instance, by disabling forward command, the robot can only move in a frontal vertical plane. The forward motion in this case can be referenced to force or proximity sensor information.

The parameter indicators appear as menus on the user interface CRT as shown in Tables 1 and 2.

TABLE 1
Parameter menu

TABLE 2
Parameter menu

| Axis | Pos. | Gain | Mode | Spring | Enable | Intensity | Axis | Slip | Velocity Limit |
|---|---|---|---|---|---|---|---|---|---|
| X | +0 | +1000 | Rate | On | On | +100 | X | On | +7 |
| Y | +0 | +1000 | Rate | On | On | +100 | Y | On | +7 |
| Z | +0 | +1000 | Rate | On | On | +100 | Z | On | +7 |
| Pitch | +0 | +1000 | Pos. | Off | On | +100 | Pitch | On | +7 |
| Yaw | +0 | +1000 | Pos. | Off | On | +100 | Yaw | On | +7 |
| Roll | +0 | +1000 | Pos. | Off | On | +100 | Roll | On | +7 |

'= Toggle Menu
Configuration:
B = XYZ – Rate Par – Position
D = Full Position
+1000
F = Position

HC

Horizontal
Servo Rate:

with                Spring

The transmission of data from the local to the remote node is done via an 8255 parallel port. Whenever a byte is transmitted a pulse is emitted on a clock line to indicate transmission of the byte.

Remote node

The remote node has a UMC identical in both software and hardware to the local node. The generated code is different slightly. The robot position gains are changeable from the UMC user interface keyboard only.

Besides the UMC there are currently two processors in the remote cardcage to allow for system expansion since the use of two processors is not justified by the current computational needs. The additional one was included to ease future expansion. The one called RC does the receiving of data from the parallel line. Whenever a new byte comes in it triggers in interrupt (8 kHz rate). This interrupt cycles through 8 phases similarly to the transmitter side. When the line is disconnected or framing is lost for some reason, control is transferred to a different chain of interrupts that waits for the signal to recover. When framing is OK for at least 300 milliseconds this receiver reactivates the normal interrupt chain.

After all 6 coordinates have been received the processor computes the new Cartesian robot coordinates see action 4, FIG. 4) and places them into the portion of its memory that is shared with the other processors in the cardcage. The RC processor indicates normal framing by blinking an LED and it also outputs the Cartesian coordinates to the screen if a terminal is connected to it. Immediately after placing the numbers into the shared RAM 594, FIG. 3, the RC processor 590 emits a pulse on one of the multibus interrupt lines, triggering the inverse kinematic procedure on the IK processor 599, FIG. 3. The IK processor has a slightly more elaborate interrupt system. The following interrupts are active on it:

Inverse Kinematic computation
Serial port 1 receive
Serial port 1 transmit
Serial port 0 receive The inverse kinematic computation is activated via the multibus by the RC processor 590. The IK algorithm we use has been reformulated compared to the generally used PUMA IK algorithm to improve its ability of handling hand commands at singularities and to improve the computation time. In particular the elbow zero point was shifted by 2.69 degrees so that the line connecting the wrist center point with the elbow axis is aligned with the upper arm when the elbow is at its newly defined zero position. This made triangulation possible using the wrist center, elbow, shoulder triangle.

The sine, cosine functions are computed using Taylor polynomials. Many other functions are computed using lookup tables with linear interpolation between two table elements.

When the computation is finished IK processor 599, FIG. 3, emits an interrupt to the UMC triggering the execution of a servo loop as was described earlier. The remainder of the operation is basically the reverse direction of that just described, and thus it is believed to be self evident by reviewing the timing and functions listed as action nos. 5 through 9, FIG. 4.

A notable property of our IK routine is the way it handles singularities. The arm setting currently is always in the right hand configuration, so the shoulder never enters the singular position. The elbow can become singular when the user tries to reach too far and the arm is not long enough. Close to the singularity the quality of control deteriorates, but basic control is maintained. As the joint becomes singular the earlier described code modification is used to replace the elbow computation with one written specifically for singular elbow. When the end point comes back and the elbow comes out of the singularity the singular elbow code activates the code modifier which chooses either upper or lower elbow configuration depending on the sign of the end effector pitch. Pitch up causes lower elbow, pitch down upper elbow configuration.

The wrist singularity behaves the same way. During operation the wrist can become singular and when it comes out of the singularity it picks the more convenient configuration. A user command (hitting W on the keyboard) exists to force the wrist into the singularity. If the wrist is in a convenient position hitting W has no effect. If the wrist is twisted and cannot reach the required orientation due to internal topological constraints (the three drive shafts in the lower arm twist and touch each other), hitting W will cause the wrist to go into the alternative, more convenient configuration by turning joint 4 with 180 degrees and flipping joint 5 over.

The way the singularities are handled in this program in manual control mode makes it possible to choose different configurations under algorithmic control of the arm by simply choosing Cartesian trajectories that traverse the singularity. Normally the Cartesian coordinates do not fully specify the joint space coordinates since they say nothing about the configuration. In our case full control of the robot is possible while commanding it manually in Cartesian space by choosing the trajectory properly, including the singularities.

The serial port 1 is used to interface to the graphics simulation. An IRIS computer is externally connected to the system and draws a graphics replica of the robot. When the drawing is finished (1/10th of a second) the IRIS sends a character to the IK serial port 1. This triggers the port 1 to receive interrupt. This interrupt makes a "snapshot" of the current robot joint coordinates (copies them over to a different memory area) and enables the port to transmit interrupt. The transmit interrupt cycles through 14 interrupt routines (2 lines each) transmitting the joint coordinates to the IRIS. The last one in the chain disables the interrupt and transmission stops.

The serial port 0 interrupt receives the keyboard characters.

The user interface of the IK processor allows the user to move the robot in Cartesian coordinates to aid in debugging.

The synchronized event sequence time diagram for the whole HC-RC-HC computational process is schematically summarized in FIG. 4. As seen there, the full computational and R/T communication cycle (HC-RC-HC) currently takes 5 msec. Assuming 2 to 3 msec electromechanical response time both at HC and RC, the effective full loop time from operator hand output to operator hand input is about 10 msec.

In summary, we have designed and developed a system that can perform HC and robot control at a 1000 Hz servo rate without interpolation. The system is globally synchronized, all stages of processing are done at the same 1 kHz servo rate. The system provides a very high fidelity (about 10 msec) feedback coupling between operator and remote robot arm in position and force modes of control.

The above description presents the best mode contemplated in carrying out our invention. Our invention is, however, susceptible to modifications and alternate constructions from the embodiments shown in the drawings and described above. Consequently, it is not the intention to limit the invention to the particular embodiments disclosed. On the contrary, the invention is intended and shall cover all modifications, sizes and alternate constructions falling within the spirit and scope of the invention, as expressed in the appended claims when read in light of the description and drawings.

What is claimed is:

1. A universal computer control system having a control processor with a memory storage device that is software accessible, said control system characterized by being of master slave type for controlling a plurality of motors that can be controlled by a software program, with some motors of the plurality of said motors being located at a master site and some motors of the plurality of said motors being located at a remote site, and said system comprising:

a system code generator in signal communication with said memory storage device of said control processor for delivering thereto a predetermined code to be stored therein in order to electronically write a software control program for controlling said plurality of motors at both site locations;

a system software control program that is written electronically by said predetermined code issued from said system control generator;

means available to a user for inputting to said control processor a hardware configuration and operating parameters for each one of said plurality of motors to be controlled by said system software control program as written by said system; and means responsive to said software control program written by said system and to said hardware configuration, and said operating parameters as input by the user into said control processor at said master site for emitting a plurality of command signals to control the operation of each one of said plurality of motors by said control processor.

2. A universal computer control system in accordance with claim 1 and further comprising:

means at said remote site sensing the system-software controlled operation of each one of said motors while they are being controlled for feeding back to said control processor a plurality of parameter signals indicative of the actual performance of each one of the controlled motors.

3. A universal computer control system in accordance with claim 2 and further comprising:

a converter at said master site for converting said feedback signals which are indicative of the motors parameters, to a format suitable for said control processor;

means feeding back said feedback signals from said converter to said control processor, whereby the feedback signals are computed as reflective force signals for said hand controller; and means connecting the control processor to the hand controller for driving the hand controller at the master site with a reflected force according to said reflective force signals as an indication to the user of the action of the robotic manipulator at the remote site.

4. A universal computer control system in accordance with claim 3 and further comprising:

a signal bus interconnecting said control process at said master site for transmitting the command signals to the motors being controlled at said remote site, and means also connecting said feedback signal emitting means at said remote site to said signal bus for feeding back signals as needed for force reflection at the master site.

5. A non-autonomous multiple-degree-freedom Force Reflecting Hand Controller ("FRHC") system at a master site where a received image displays to an operator, in essentially real-time, a remote robotic manipulator which is being controlled in a corresponding multiple-degree-freedom by command signals which are formulated at the master site for transmission to a remote site in accordance with an operator-controlled movement of the FRHC at the master site, said system comprising:

software, user-initiated at the master site and written by the system itself, in order to establish basic system operating conditions;

a first control processor means at the master site for translating an operator's physical movement of the FRHC in Cartesean space into numbers indicative of relative movements of said FRHC in each degree of said multiple-degree-freedom, which numbers are formulated at said master site into said command signals for achieving a corresponding relative movement of said robotic manipulator at said remote site;

means for transmitting said command signals to said remote site for moving said robotic manipulator to a new and different commanded position relative to the robot's earlier position; and second processor control means at said remote site for returning to said master site, over said transmitting means, signals indicative of the robotic movements in order to provide a "feel" of those movements for the operator at the master site.

6. A system in accordance with claim 5 wherein a change in position in the robot at the remote site results from a difference in absolute positioning of said FRHC at said master site, and further comprising:

means at said master site for sensing the relative change in position of said FRHC;

said signal transmitting means is a high speed synchronized bilateral communication channel; and means for converting that relative change of position of said FRHC to a differential signal form for transmission over said high speed synchronized bilateral communication channel.

7. A system in accordance with claim 6 and further comprising;

means for detecting in signal form, said change in position of said commanded robot manipulator at said remote site; and means for supplying said signals indicative of said change in position to said second independent control processor.

8. A system in accordance with claim 7, wherein the control processors at each site are performing mathematically intense computations, and said system further comprising;

means for transmitting commands and returning robot-sensed response information to the master site at a sufficiently high rate that the FRHC reflects a "feel" of what is taking place at the remote site in essentially real time.

9. A system in accordance with claim 8 and further comprising;

means for emitting a system-wide clock signal, selected at said sufficiently high rate, that the operator at the master site may experience the operation of said commanded robot at said remote site in essentially real time in a force-reflecting mode for said master site: and means for operating said system's signal communication between both of said sites with said system-wide clock signal in order to provide said essentially real time operation.

10. A non-autonomous multiple-degree freedom Hand Controller ("HC") system at a master site where a received image displays, in essentially real-time, a remote robotic manipulator which is to be controlled in a corresponding degree-of-freedom by relative movement command signals which are formulated for transmission to a remote site in accordance with an operator's command at the master site, said system including a first control system at the master site and a second control system at the remote site, and said "HC" system comprising:

software, operator-initiated at the master site and written by the system itself, in order to establish, at least in part, the command formulated by said first control system for transmission to said second control system at the remote site;

means translating operator-initiated movement of the HC in Cartesean space at the master site into a transmissible command signal that includes said software input and is indicative of relative movement of said HC in each of said degrees-of-freedom as desired for controlled system movement of said robotic manipulator at said remote site;

means associated with said first control system for transmitting said transmissible command signal to said second control system at said remote site; and means in said second control system at said remote site for receiving said command signal transmitted from said master site and responsive thereto for moving said robot manipulator to a new and different commanded position, relative to the robot's earlier position, which corresponds to the relative movement of the HC by the operator at the master site.

11. A system in accordance with claim 10 wherein a change in position of the manipulator at the robot site results from a relative difference as said HC is moved from one position to another at said master site, and further comprising:

means at said master site for sensing the amount of relative change in position of said HC; and means for converting that relative change of position to a differential signal form for transmission over a high speed synchronized bilateral communication channel.

12. A system in accordance with claim 10 and further comprising;

means for detecting in signal form, said change in position of said commanded robotic manipulator at said remote site; and means for transmitting said change of commanded position signal back to said master site in order to develope a "feel" at the HC at the commanded position change has taken place at the robotic manipulator.

13. A system in accordance with claim 12 wherein said means for transmitting is characterized as further comprising;

means for returning robot-sensed response information to the master site so that said HC reflects an image/"feel" in essentially real time of what is taking place at said robotic manipulator at the remote site.

14. A system in accordance with claim 13 and further comprising;

means for emitting a system-wide clock signal, selected at a sufficiently high rate, that the operator at the master site may experience the operation of said commanded robot at said remote site in essentially real time in a force-reflecting mode for said HC at said master site: and means for operating said system's signal communication between both of said sites over said high speed communication channel at said system-wide clock signal rate in order to provide said essentially real time operation.

15. A method of controlling a multiple-degree-freedom Force Reflecting Hand Controller ("FRHC") at a master site where a received image displays, in essentially real-time, a remote robotic manipulator which is to be controlled in a corresponding degree-of-freedom by operator-formed command signals which are formulated for transmission to a remote site in accordance with an operator's command at the master site, said method comprising:

operating software at the master site, in order to establish, at least in part, a desired command for the remote site;

writing said operating software by the system itself;

translating relative movement of the FRHC in Cartesean space at the master site into a transmissible command signal that includes said software input and is indicative of a desired degree-of-freedom movement for said manipulator at said remote site; and transmitting said transmissible command signal to said remote site for moving said robot manipulator to a new and different commanded position relative to the robot manipulator's earlier position.

16. A method in accordance with claim 15 wherein a change in position of the manipulator at the robot site results from a difference in absolute positioning of said FRHC at said master site, and further comprising:

sensing the relative change in position of said FRHC at said master site;

converting that relative change of position to a differential form for transmission to said remote site;

transmitting that signal in differential form to the remote site;

receiving the transmitted signals at the robot's control system located at the remote site; and slowly and smoothly moving the remote manipulator in accordance with the received signals.

17. A method in accordance with claim 16 and further comprising;

detecting, in signal form, said change in actual position of said commanded robot manipulator at said remote site; and returning said detected signal to the master site as a reflection of the action taken at the remote site.

18. A method in accordance with claim 17 and further comprising;

returning robot-sensed response information to the master site;

converting, in essentially real time, the returned information into a FRHC resistance that reflects an "feel" of what is taking place to said manipulator at the remote site; and displaying, for an operator at the master site also in essentially real time, the robot's movements at the remote site.

19. A method in accordance with claim 15 and further comprising;
instituting a force-reflecting mode for said FRHC at the master site: and
operating said system at both of said sites in essentially real time so that the FRHC reflects the remote manipulator's actual response.

20. A method in accordance with claim 15, wherein intense hardware/software controlling computations are required at each site; and said method comprises the additional steps of:
performing such computations by interrupt-driven servo loops: and
operating said servo loops over a bilateral transmission control that connects the master site with the slave site.

21. A method in accordance with claim 20 characterized by interrupt driven software combined with hardware synchronism, and further wherein said step of performing said computations includes the substeps of:
synchronizing said computational capabilities at both sites by a common clock; and
operating said servo loops over a balanced load on the bilateral communication channel that interconnects the two sites.

22. A method in accordance with claim 20 including kinematic and dynamic relations between the master and robot arms, and including the further step of;
embedding mathematical transformations in computer programs in both the master and the remote sites; and
controlling the remote and the master site robots by the mathematical transformations embedded in said computer programs.

23. A method in accordance with claim 22 wherein forward and inverse kinematic computations, necessary for controlling a robotic manipulator, comprising the substeps of;
performing at the remote site by a forward kinematic ("FK") processor and an inverse kinematics ("IK") processor.

24. A method in accordance with claim 23 and further comprising the additional step of:
connecting both the "FK" and the "IK" processors to a multibus system; and
providing a shared memory to be used by the "FK" and the "IK" processors.

25. A method in accordance with claim 24 wherein a joint command processor ("JOINT") responds to the "IK" processor, and said method is further comprising the steps of:
sensing the FRHC-commanded actual movements of the robot; and
feeding back signals indicative of that sensed movement to the master site over said bilateral communication channel.

26. A method in accordance with claim 25 wherein said sensed signals are received at the master site after being transmitted over said communication channel, and said method includes the further steps of:
transforming the received signals at the master site to forces of "feel" for the operator in the FRHC at the master site.

27. A method in accordance with claim 26 and further comprising the additional steps of:
presenting at the master site for said operator a visual record of the controlled manipulator's movements; and
supplying the visual record in essentially real time while the operator can sense resisting forces on the FRHC as a reflected "feel" of the control over the robot's movements at the remote site.

* * * * *

UNITED STATES PATENT OFFICE
CERTIFICATE OF CORRECTION

PATENT NO. : 5,038,089
DATED : August 6, 1991
INVENTOR(S) : Zoltan F. Szakaly

It is certified that error appears in the above-identified patent and that said Letters Patent is hereby corrected as shown below:

Title page, [63]: delete "abandoned" and insert, in place thereof, --issued Sept. 10, 1991 as U.S. Patent 5,047,700--.

Column 1, lines 16 and 17: delete "now abandoned" and insert, in place thereof, --issued Sept. 10, 1991 as U.S. Patent 5,047,700--.

Signed and Sealed this

Twenty-second Day of June, 1993

Attest:

MICHAEL K. KIRK

Attesting Officer

Acting Commissioner of Patents and Trademarks